United States Patent [19]
Dalton et al.

[11] Patent Number: 5,934,255
[45] Date of Patent: Aug. 10, 1999

[54] FUEL CONTROL SYSTEM

[75] Inventors: Joel Douglas Dalton, Ann Arbor; Robert Frederick Dona, Troy; William Edward Boruta, Dearborn; John William Holmes, Eastpointe, all of Mich.

[73] Assignee: Ford Global Technologies, Inc., Dearborn, Mich.

[21] Appl. No.: 09/035,123

[22] Filed: Mar. 5, 1998

[51] Int. Cl.⁶ .................................................. F02M 51/00
[52] U.S. Cl. .......................... 123/478; 123/1 A; 123/494
[58] Field of Search ..................... 123/1 A, 478, 123/494

[56] References Cited

U.S. PATENT DOCUMENTS

| | | | |
|---|---|---|---|
| 5,172,655 | 12/1992 | Forgacs | 123/494 |
| 5,195,497 | 3/1993 | Yoshida et al. | 123/1 A |
| 5,253,631 | 10/1993 | Curran . | |
| 5,325,836 | 7/1994 | Orzel et al. . | |
| 5,647,304 | 7/1997 | Nyberg et al. | 123/1 A |

Primary Examiner—John Kwon
Attorney, Agent, or Firm—Donald A. Wilkinson

[57] ABSTRACT

A fuel control system and method for an engine having a returnless fuel system uses a fuel blend sensor to adjust a desired air/fuel ratio to allow continuous fuel blend changes. Engine operating conditions are monitored and used to track the movement of small fuel quantities from the fuel blend sensor to the fuel injectors. The system and method use the cells in the stack to represent the volume of the fuel quantities and their corresponding measured fuel blend.

9 Claims, 2 Drawing Sheets

FUEL CONTROL SYSTEM

FIELD OF THE INVENTION

The invention relates to air/fuel ratio control systems responsive to fuel sensors that measures fuel blend ratios.

BACKGROUND OF THE INVENTION

Fuels other than gasoline and diesel are increasingly being used as an energy source for internal combustion engines because of possible reduction in certain regulated emissions. In particular, methanol and gasoline blends are commonly encountered. The engine air/fuel ratio control system must be able to detect these blends and make adjustments to the engine control parameters in order to maintain optimum operation.

In particular, measuring the fuel blending ratio is critical because of the relationship between the blending ratio and the stoichiometric air/fuel ratio. As the blending ratio changes, and thus the chemical makeup of the fuel changes, the stoichiometric air/fuel ratio changes. Unless the air/fuel control system has information regarding the fuel blend, the control system must rely on exhaust gas sensor feedback signals to maintain stoichiometric combustion. While this approach will maintain stoichiometric combustion, significant errors can be encountered during transient operation.

When using a fuel blend sensor to eliminate the transient problems related to the feedback control, another error can be experienced related to the location of the sensor. Typically, the sensor is placed upstream of the fuel rail and fuel injectors, which deliver fuel to the engine. When an unknown blend of new fuel is added to the fuel tank, it takes a certain interval for the new fuel blend to reach the sensor. Then, it takes another interval before the new fuel blend reaches the fuel injectors. The engine control system must be able to compensate for this delay so that the proper air/fuel ratio is maintained when the new fuel blend finally reaches the fuel injectors.

When the fuel system comprises a conventional mechanical return fuel system, a substantially constant flow rate of fuel is continually recirculated regardless of engine operating conditions. Thus, it takes a predetermined time for the new fuel to move from the sensor to the fuel rail. Therefore, the engine control system can predict when the new fuel blend will reach the engine and compensate accordingly. Such a system is disclosed in the U.S. Pat. No. 5,325,836.

The inventors herein have recognized numerous disadvantages with the above approaches. One disadvantage is that when the engine comprises an electronic returnless fuel system, the time for fuel to move from the sensor to the fuel rail is not constant, but rather a function of engine operating conditions. Another disadvantage is that, because the time delay is a function of engine operating conditions, the above described method is only valid for constant engine operating parameters. Yet another disadvantage is that, because the fuel blend does not change instantaneously, but gradually as the new fuel and old fuel mix, time based compensations are insufficient.

SUMMARY OF THE INVENTION

An object of the invention claimed herein is to provide an engine air/fuel ratio control system capable of maintaining a stoichiometric air/fuel ratio during changes in the fuel blending ratio while being, insensitive to continual changes in engine operating conditions.

The above object is achieved, and disadvantages of prior approaches are overcome, by providing a novel air/fuel ratio control method for an internal combustion engine coupled to a returnless fuel system. In one particular aspect of the invention, the method includes the steps of creating a spatial fuel blend gradient within said fuel system based on sensed fuel blend parameters, fuel consumption rate, and fuel system volume and calculating a desired injected fuel quantity necessary to create a stoichiometric air/fuel ratio mixture, with said calculation being based on said gradient.

Creating a spatial fuel blend gradient allows the electronic engine controller to predict the stoichiometric air/fuel ratio of the fuel entering the engine. This spatial fuel blend gradient is created by the electronic engine controller by tracking a small volume of fuel from the fuel blend sensor to fuel injectors. The stoichiometric air/fuel ratio is calculated from the fuel blend sensor reading at the point when the small quantity of fuel is in contact with the sensor. The progress of the small quantity of fuel is calculated from the commanded pulse width of the injectors. Thus, the electronic engine control system can more accurately control the mixture air/fuel ratio in the engine.

In another aspect of the invention, the method comprises dividing a volume of a transport line into a predetermined number of cells and estimating a fuel mass used in the engine. The estimate is responsive to a pulse width of fuel injectors. The method further comprises generating an incremental signal each time the fuel mass used reaches the volume of one cell, generating an estimated stoichiometric air/fuel ratio value responsive to a current value of the fuel blend sensor, and adjusting a desired air/fuel ratio based on said estimated stoichiometric air/fuel ratio value when the predetermined number of cell volumes have been used by the engine.

An advantage of the present invention is that the method is insensitive to engine operating conditions.

Yet a further advantage of the present invention is the ability to operate with a continuously variable fuel blend supply.

Other objects, features and advantages of the present invention will be readily appreciated by the reader of this specification.

BRIEF DESCRIPTION OF THE DRAWINGS

The invention will now be described, by way of example, with reference to the accompanying drawing, in which.

DESCRIPTION OF THE PREFERRED EMBODIMENT

Figure 1:
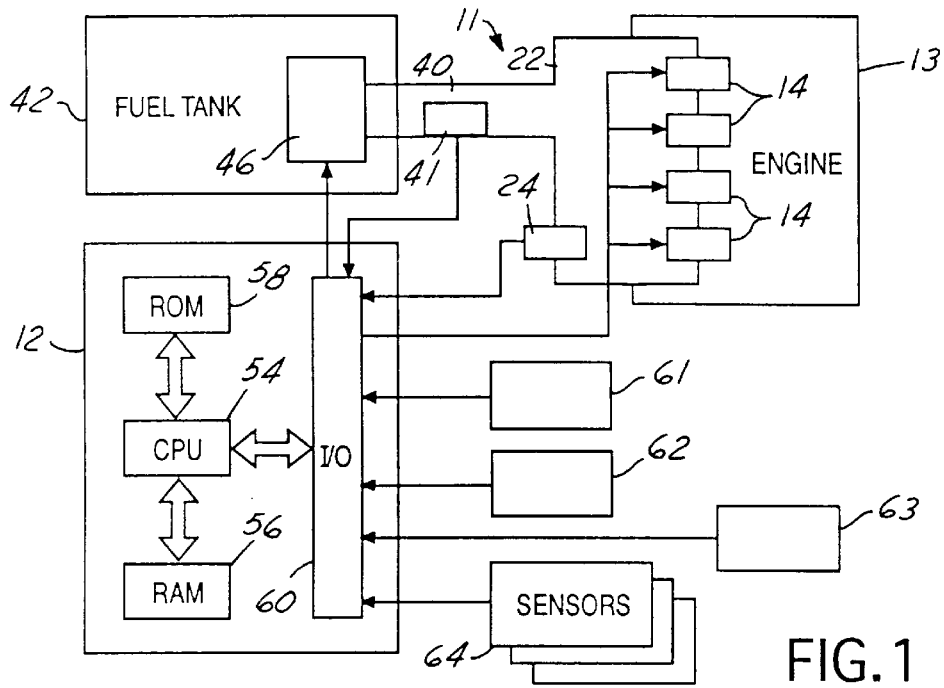
FIG. 1 is a block diagram of an engine incorporating an air/fuel ratio control system according to the present invention.

Electronically controlled returnless fuel delivery system 11, shown in FIG. 1, of an automotive internal combustion engine 13 is controlled by controller 12, such as an EEC or PCM. Engine 13 comprises fuel injectors 14, which are in fluid communication with fuel rail 22 to inject fuel into the cylinders (not shown) of engine 13. Electronically controlled returnless fuel delivery system 11 includes fuel rail 22, fuel rail pressure sensor 24 connected to fuel rail 22, fuel line 40 coupled to fuel rail 22, fuel blend sensor 41 connected to fuel line 40, a fuel holding means such as fuel tank 42, and electronically controlled fuel delivery control means 46 to selectively deliver fuel from fuel tank 42 to fuel rail 22 via fuel line 40. In this example, fuel tank 42 houses fuel delivery control means 46, which is an electronically controlled fuel pump.

Controller 12 includes CPU 54, random access memory 56 (RAM), computer storage medium (ROM) 58, having a computer readable code encoded therein, which is an electronically programmable chip in this example, and input/output (I/O) bus 60. Controller 12 controls engine 13 by receiving various inputs through I/O bus 60 such as fuel pressure in fuel deliver system 11, as sensed by pressure sensor 24; the position of ignition switch 61; engine speed as sensed by engine speed sensor 62; inducted air flow as sensed by mass air flow sensor 63; fuel blend as sensed by fuel blend sensor 41; and other sensors (shown collectively as 64) known to those skilled in the art and suggested by this disclosure. Controller 12 also controls various outputs through I/O bus 60 to actuate the various components of the electronically controlled returnless fuel delivery system 11 and engine 13. Such components include fuel injectors 14 and fuel delivery control means 46.

Fuel delivery control means 46, upon demand from engine 13 and under control of controller 12, pumps fuel from fuel tank 42 through fuel line 40, and into fuel rail 22 for distribution to the fuel injectors during steady state operation. Controller 12 records fuel rail pressure as sensed by sensor 22 and controls fuel delivery control means 46 to maintain a desired fuel rail pressure. In returnless fuel delivery systems, fuel within tank 42 enters fuel delivery control means 46 through an inlet where it is pumped up to a higher pressure and exits of fuel delivery control means 46. The fuel then enters fuel line 40. Then, the fuel enters fuel rail 22 where it is controlled by fuel injectors 14. Conventional fuel blend sensor 41, located upstream of fuel injectors 14, measures fuel properties indicative of the proper stoichiometric air/fuel ratio. In other words, as is known to those skilled in the art, fuel blend sensor 41 indicates a relative fuel blend ratio, which can be used with other known engine operating parameters and predetermined fuel blend data to determine a proper stoichiometric air/fuel ratio. Without fuel blend sensor 41, controller 12 must rely on exhaust sensor feedback control to estimate the fuel blend ratio. In practice, it is difficult to separate the effects of the blend from other effects such as error in the mass flow estimate, or error in the injector flow characterizations. Thus, controller 12 adjusts the quantity of fuel injected by injectors 14 based on fuel blend sensor 41 and mass air flow sensor 63 as described later herein with particular reference to FIGS. 2, 3A–3C, and 4.

Figure 2:
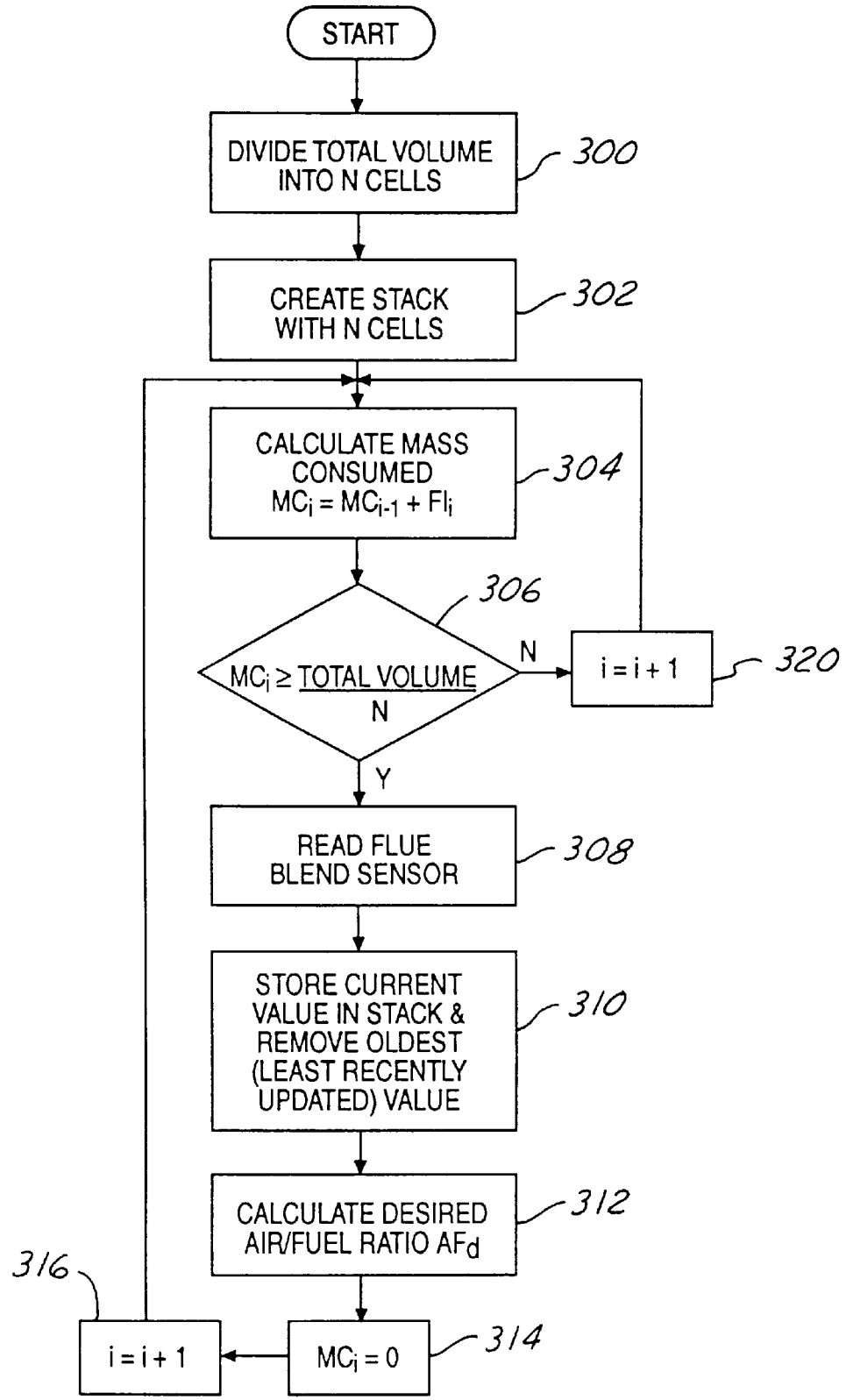
FIG. 2 is a flowchart of various operations according to the present invention.

According to the present invention, as shown in FIGS. 2, the routine executed by controller 12 for calculating desired air/fuel ratio (AFd) for engine 13 having returnless fuel system 11 is now described. During step 300, the total volume of fuel delivery system 11 is divided into a predetermined number (N) of cells. The total volume referred to herein is the average volume of fuel delivery system 11 between fuel blend sensor 41 and one of the fuel injectors 14. The number of cells (N) is determined by the desired resolution and computational limits.

Continuing with FIG. 2, in step 302 a first in first out stack is created having N cells. Each of the N cells represents a small volume of the total volume as described later herein. The stack stores N value, replacing the oldest value in the stack with a new value. Thus, the first value place in the stack is the first value removed from the stack, as described later herein with particular reference to FIG. 3. Next, the mass consumed since the last update of the stack ($MC_i$) is calculated at each sample (i) in step 304 by adding the calculated mass consumed in the previous sample to the fuel injected since the previous sample ($FI_i$). The fuel injected since the previous sample ($FI_i$) can be calculated from the fuel injector pulse width signal (FPW) and fuel rail pressure. When the mass consumed is greater than or equal to the volume of one cell, then the cells must be incremented and updated. In other word, when the mass consumed since the last update is greater than or equal to the total volume divided by the number of cells (N) (step 306), which is the volume represented be each of the N cells, then the following steps occur: In step 308 the fuel blend sensor is read. Next, in step 310, the fuel blend sensor value read in step 308 is stored in the stack and the least recently stored value is removed. Then, in step 312, desired air/fuel ratio (AFd) is calculated based on the least recently stored value removed in step 310. Next, in step 314 the mass consumed is reset to zero and sample index (i) is incremented (step 316).

However, when the mass consumed is less than the volume represented be each of the N cells as determined in step 306, then sample index (i) is incremented (320) and the routine continues to monitor the volume of the mass consumed.

Figure 3A:
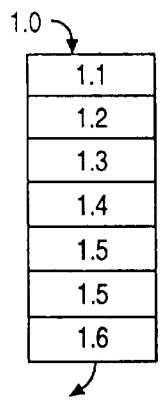
FIGS. 3A–3C are a block diagram of an example of a first in first out stack according to the present invention.
Figure 3B:
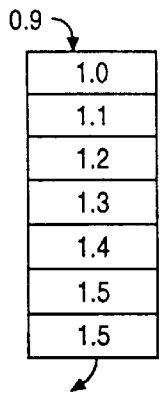
Figure 3C:
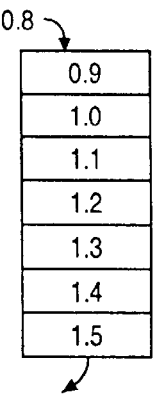

The stack is now described with particular reference to FIGS. 3A, 3B, and 3C, which show the stack after three successive updates corresponding to the engine consuming three volumes of fuel equal, each volume being equal to the total volume divided by the number of cells (N). For example, in FIG. 3A, the stack is shown with N=7, a current fuel blend sensor reading of 1.0, and 7 values ranging from 1.0 to 1.6 shown with the newest value at the top and the oldest value at the bottom. For this case, the value of 1.0 would be placed in the top of the stack and each value in the stack would move down one position, with a value of 1.6 being removed and used by controller 12 to create the desired air fuel ratio (AFd). FIG. 3B represents the next update of the stack in this example. The current fuel blend sensor reading is 0.9, which is added to the stack as shown. For this case, the bottom value of 1.5 is removed and used by controller 12 to create the desired air fuel ratio (AFd). Finally in this example, as shown in FIG. 3C, the current fuel blend sensor reading is 0.8, which is added to the top of the stack as shown. For this case, the bottom value of 1.5 is removed and used by controller 12 to create the desired air fuel ratio (AFd).

Figure 4:
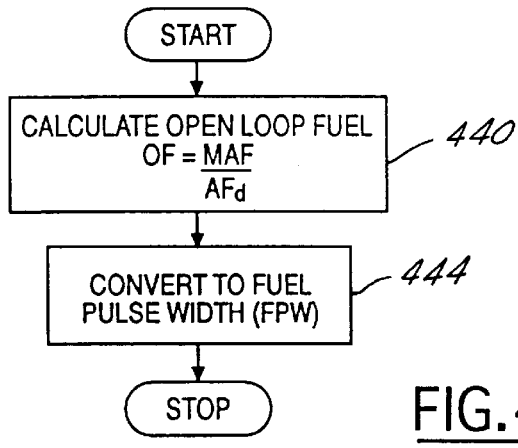
FIG. 4 is a flowchart of various operations according to the present invention.

The routine executed by controller 12 to generate the desired quantity of fuel delivered to engine 13 for maintaining a desired engine air/fuel ratio is now described with reference to FIG. 4. During step 440, an open-loop fuel quantity is first determined by dividing a measurement of inducted mass airflow (MAF) by the desired air/fuel ratio (AFd), which is typically the stoichiometric value and determined by the routine described previously herein. During step 444, the open-loop fuel quantity is converted to fuel pulse width signal (FPW), which is used to control the fuel injectors thereby creating the proper stoichiometric air/fuel ratio.

This method allows controller 12 to track the progress of a small volumes of fuel (equal to the total volume divided by the number of cells, N) and its corresponding stoichiometric air/fuel ratio (as measured by the fuel blend sensor when the volume of fuel was in contact with the sensor) through the use of the first in first out stack. Thus, controller 12 can account for changes in fuel consumption rate of an engine coupled with a returnless fuel system.

The first-in first-out stack filled with stoichiometric air/fuel ratio values corresponding to small volumes of fuel represents a spatial fuel blend gradient. In other words, a spatial fuel blend gradient refers to a characterization in terms of spatial variables (such as volume or mass per unit volume) of the fuel blend entering the engine. Alternatively, as known to those skilled in the art and suggested by this disclosure, the spatial fuel blend gradient could be created by extending the number of cells (N) to infinity thus creating a continuum model. In the preferred embodiment, controller 12 only uses the stoichiometric air/fuel ratio value corresponding to the quantity of fuel entering the engine. However, if higher precision was needed to more accurately determine the stoichiometric air/fuel ratio value, more than one and even all of the cell values could be used. For example, an $N^{th}$ order polynomial estimate could be used to continually update the stoichiometric air/fuel ratio value for every injection rather than waiting until the volume of fuel represented by one cell is used.

While the best mode for carrying out the invention has been described in detail, those skilled in the art in which this invention relates will recognize various alternative designs and embodiments, including those mentioned above, in practicing the invention that has been defined by the following claims.

We claim:

1. An air/fuel ratio control method for an internal combustion engine coupled to a returnless fuel system comprising the steps of:

creating a spatial fuel blend gradient within said fuel system based on sensed fuel blend parameters, fuel consumption rate, and fuel system volume; and calculating a desired stoichiometric air/fuel ratio mixture, with said calculation being based on said gradient.

2. The method recited in claim 1 further comprising the step of calculating a desired injected fuel quantity responsive to said desired stoichiometric air/fuel ratio mixture and at least one engine operating condition.

3. The method recited in claim 2 wherein said engine operating conditions comprise a mass of air inducted into the engine.

4. The method recited in claim 1 wherein said creating step further comprises the steps of:

dividing a volume of a fuel transport line into a predetermined number of cells;

creating a first in, first out stack comprising said predetermined number of cells;

estimating a fuel mass used in the engine responsive to a pulse width of injectors;

generating a incrementing signal each time the fuel mass used reaches the volume of one cell;

generating an estimated stoichiometric air/fuel ratio value responsive to a current value of the fuel blend sensor;

storing a current value of the estimated stoichiometric air/fuel ratio in said stack upon each occurrence of said incrementing signal; and generating a spatial fuel blend gradient based on all of the values in said stack.

5. An air/fuel ratio control method for an internal combustion engine coupled to an electronic returnless fuel system comprising an electronically controlled pump connected to a fuel tank containing a blend of fuel, a transport line for connecting an output of said pump to a fuel rail, a plurality of electronically controlled fuel injectors connected to said transport line, and a fuel blend sensor located between the fuel tank and the injectors, the method comprising the steps of:

dividing a volume of said transport line into a predetermined number of cells;

estimating a fuel mass used in the engine responsive to a pulse width of the injectors;

generating a incrementing signal each time the fuel mass used reaches the volume of one cell;

generating an estimated stoichiometric air/fuel ratio value responsive to a current value of the fuel blend sensor; and adjusting a desired air/fuel ratio based on said estimated stoichiometric air/fuel ratio value when said predetermined number of cell volumes have been used by the engine.

6. The method recited in claim 5 further comprising the step of adjusting a fuel pulse width of the injectors in response to the desired air/fuel ratio and a mass of air inducted into the engine.

7. The method recited in claim 5 wherein said dividing step comprises the step of dividing said transport line volume between the fuel blend sensor and injectors.

8. An air/fuel ratio control system for an internal combustion engine comprising:

an electronic returnless fuel system comprising an electronically controlled pump connected to a fuel tank capable of containing a blend of fuels, a transport line for connecting an output of said pump to a fuel rail, a plurality of electronically controlled fuel injectors connected to said fuel rail, and a fuel blend sensor located between said fuel tank and said injectors; and a controller for controlling said electronic returnless fuel system, with said controller creating a spatial fuel blend gradient within said fuel system based on sensed fuel blend parameters, fuel consumption rate, and fuel system volume and calculating a desired stoichiometric air/fuel ratio mixture, with said calculation being based on said gradient.

9. The system recited in claim 8 wherein said controller divides a volume of said transport line into a predetermined number of cells, creates a first-in, first-out stack comprising said predetermined number of cells, estimates a fuel mass used in the engine responsive to a pulse width of the injectors, generates an incrementing signal each time the fuel mass used reaches the volume of one cell, generates an estimated stoichiometric air/fuel ratio value responsive to a current value of the fuel blend sensor, stores a current value of the estimated stoichiometric air/fuel ratio in said stack upon each occurrence of said incrementing signal, removes from the stack one of said estimated stoichiometric air/fuel ratio values upon each occurrence of the incrementing signal, with said one of said estimated stoichiometric air/fuel ratios being a least recently stored air/fuel ratio value, and adjusts a desired air/fuel ratio based on said least recently stored one of said estimated stoichiometric air/fuel ratio values.

\* \* \* \* \*